United States Patent [19]

Hamane et al.

[11] Patent Number: 4,576,269
[45] Date of Patent: Mar. 18, 1986

[54] AUTOMATIC MULTISPEED TRANSMISSION FOR VEHICLES WITH MANUAL MEANS FOR PROHIBITION OF ENGAGEMENT OF A CENTRIFUGAL CLUTCH

[75] Inventors: Masumi Hamane, Kawagoe; Kaoru Hanawa, Asaka, both of Japan

[73] Assignee: Honda Giken Kogyo K.K., Japan

[21] Appl. No.: 457,355

[22] Filed: Jan. 12, 1983

[30] Foreign Application Priority Data

Jan. 13, 1982 [JP] Japan .................................. 57-3777
Jan. 13, 1982 [JP] Japan .................................. 57-3778

[51] Int. Cl.[4] ............................................. F16D 23/10
[52] U.S. Cl. ............................ 192/103 A; 74/865; 192/105 C
[58] Field of Search ........................... 474/11, 13, 14; 192/93 A, 99 A, 103 A, 105 C, 105 CP, 106 R; 74/856, 865

[56] References Cited

U.S. PATENT DOCUMENTS

| | | | |
|---|---|---|---|
| 2,126,760 | 8/1938 | Eason | 192/93 A X |
| 2,136,811 | 11/1938 | Burtnett | 192/105 C X |
| 2,326,279 | 8/1943 | Banker | 192/105 CP |
| 2,446,138 | 7/1948 | Lambert | 192/93 A |
| 2,447,007 | 8/1948 | Gravina et al. | 192/105 C X |
| 2,513,378 | 7/1950 | Thelander | 192/105 C |
| 3,091,315 | 5/1963 | Maurice et al. | 192/105 C |
| 4,061,439 | 12/1977 | Pech | 192/103 A X |

FOREIGN PATENT DOCUMENTS 308301  2/1930  United Kingdom ............ 192/105 C

Primary Examiner—Leslie A. Braun
Assistant Examiner—Dwight G. Diehl
Attorney, Agent, or Firm—Arthur L. Lessler

[57] ABSTRACT

In an automatic multispeed transmission having at least two centrifugal clutches arranged on a rotary shaft driven by the output shaft of an engine and adapted to engage at predetermined different rotational speeds and higher of the rotary shaft, each clutch having an input member drivingly engageable with an output member by the opening motion of weights, an engagement prohibiting mechanism is provided, which is manually operable to prohibit the opening motion of the weights of one of the clutches which is engageable at a predetermined rotational speed higher than that of the lowest engaging speed clutch. Further, a disabling mechanism is provided to release the engagement prohibiting mechanism from its prohibiting action to permit the opening motion of the weights when the centrifugal force of the weights is larger than a predetermined value.

12 Claims, 4 Drawing Figures

AUTOMATIC MULTISPEED TRANSMISSION FOR VEHICLES WITH MANUAL MEANS FOR PROHIBITION OF ENGAGEMENT OF A CENTRIFUGAL CLUTCH

BACKGROUND OF THE INVENTION

The present invention relates to an automatic multispeed transmission for use in vehicles, and more particularly to an automatic multispeed transmission which is adapted to improve the driveability of a vehicle such as a motorcycle on which it is mounted, when the vehicle undergoes large running resistance.

Vehicles, in particular, motorcycles having small displacements are generally equipped with automatic multispeed transmissions each having a plurality of speed change gears which are each provided with a centrifugal clutch simple in construction to facilitate the speed controlling operation of the vehicles and smooth the starting or accelerating operation of same. In such automatic transmissions, the centrifugal clutches each forming part of a speed change gear are each adapted to engage at a predetermined engaging rotational speed, whereby the transmission automatically performs speed change at a plurality of changing points corresponding to the predetermined engaging rotational speeds of the clutches. Preferably, an automatic transmission of this type should be designed such that the driver can drive the vehicle at any desired speed and with any desired driving force or torque in various conditions including starting, accelerating and slope-ascending.

However, a vehicle equipped with a transmission of this type has a disadvantage in driveability when it undergoes large running resistance, for instance, when ascending a steep slope.

For example, in an automatic three-speed transmission for motorcycles, which has three centrifugal clutches for low, medium and high speeds, wherein the engaging rotational speeds of the clutches for the medium and high speeds, are set to 10 km/hr. and 20 km/hr., respectively, as two speed changing points, the motorcycle is driven by a high or third speed gear due to engagement of the high speed clutch when it is running at a speed higher than 30 km/hr.

The reduction ratio of the high or third speed gear is set at a value smaller than that of the medium or second gear so that the engine speed is low relative to the vehicle during high speed running, that is, during the engagement of the high speed gear. Therefore, when the running resistance applied to the motorcycle increases, for instance, in ascending a steep slope at a speed of 30 km/hr. with the high speed gear engaging, the running speed can decrease due to insufficient driving force. That is, the driving force required for ascending the slope can be obtained only after the running speed has decreased below about 20 km/hr. to change the high speed clutch to the medium speed gear. If the driver nevertheless increases the vehicle speed by operating the accelerator so as to ascend the slope at a speed of 30 km/hr. or so, the transmission is automatically shifted up to the high speed gear at the changing point of 20 km/hr., resulting in a drop in the driving force. Therefore, to avoid a drop in the driving force, the driver is compelled to keep the running speed at a speed below 20 km/hr., with the medium speed gear engaging during ascending the slope.

As explained above, a vehicle equipped with an automatic multispeed transmission of the above mentioned type which effects automatic speed change at predetermined fixed changing points regardless of the running resistance could fail to provide a running speed and a driving force desired by the driver.

SUMMARY OF THE INVENTION

It is an object of the invention to provide an automatic multispeed transmission for use in a vehicle, which is adapted to permit engagement of a gear having a larger reduction ratio when the vehicle has large running resistance, to obtain a sufficient driving force, enabling driving of the vehicle at any desired speeds regardlees of the running resistance, and which is simple in construction.

It is another object of the invention to provide an automatic multispeed transmission which is adapted to cause engagement of a gear having a smaller reduction ratio when the engine speed exceeds a predetermined value, to thereby avoid overspeed of the engine as well as shocks upon a speed changing action.

An automatic multispeed transmission according to the present invention is provided with at least one rotary shaft arranged to be driven by the output shaft of an engine, and at least two centrifugal clutches arranged on the rotary shaft and engageable at predetermined different rotational speeds of the rotary shaft. Each clutch has an input member arranged to be driven by the rotary shaft, an output member engageable with the input member and weight means displaceable in response to the rotation of the rotary shaft for causing the input member to engage with the output member at a predetermined rotational speed. Reduction gear means drivingly coupled with the output members of the respective clutches carry out speed reduction of the rotational speed of the output shaft of the engine with predetermined different reduction ratios dependent upon engagement and disengagement of the respective clutches. Means is provided for prohibiting the centrifugal opening action of the weight means of one of the clutches which has a predetermined engaging rotational speed higher than the lowest one. The prohibiting means is driven by manually operatable control means to effect the prohibiting action. Further, disabling means is provided for releasing the prohibiting means from its prohibiting action when the centrifugal force of the weight means of the above one clutch exceeds a predetermined value.

The above and other objects, features and advantages of the invention will be readily understood from the ensuing detailed description taken in conjunction with the accompanying drawings.

DETAILED DESCRIPTION

Figure 1:
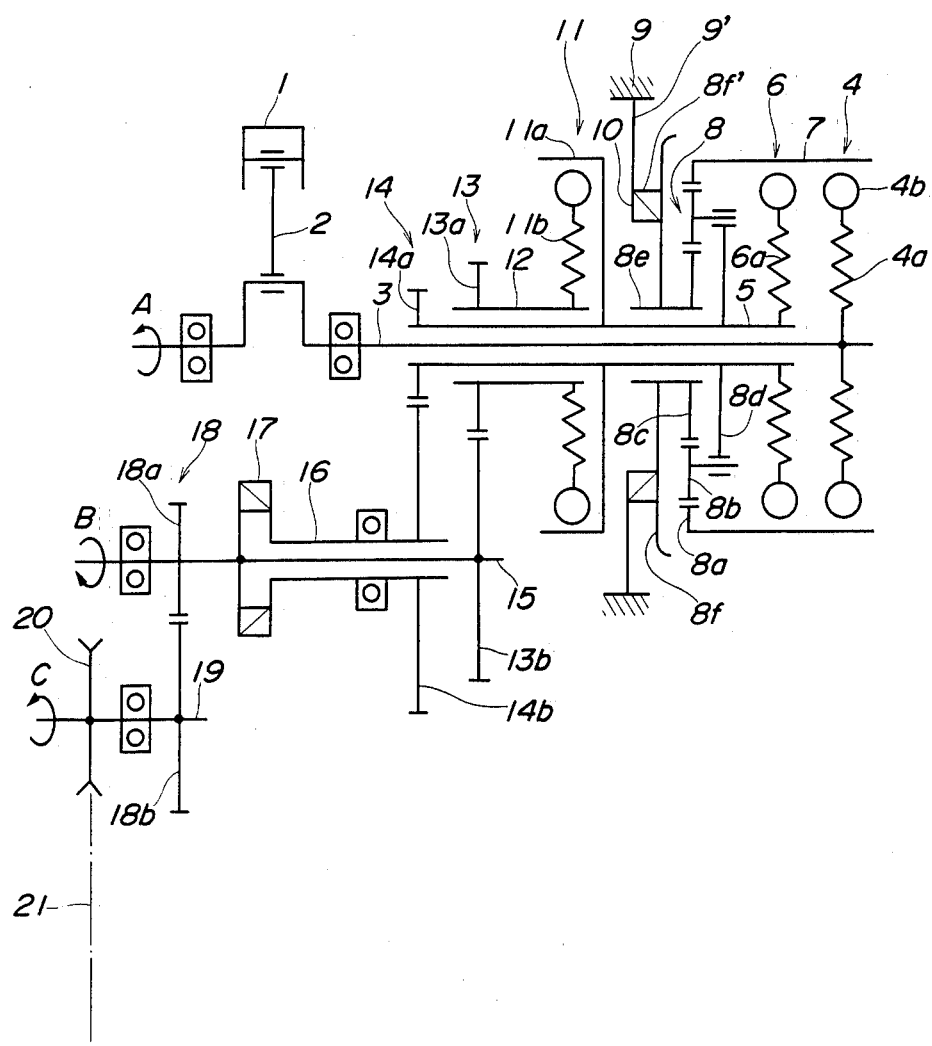
FIG. 1 is a schematic view illustrating, by way of example, a conventional automatic three-speed transmission.

Referring first to FIG. 1, a conventional automatic three-speed transmission for use in motorcycles is illustrated. Reference numeral 1 designates a piston, reciprocating motions of which are converted into rotation of an output shaft or crankshaft 3 of an engine, not shown, through a connecting rod 2. A clutch inner member 4a of a centrifugal clutch 4 for a first or low speed is mounted on an end of the crankshaft 3. A first hollow shaft 5 is rotatably loosely fitted on the crankshaft 3, on one end portion of which is mounted a clutch inner member 6a of a centrifugal clutch 6 for a second or medium speed at a location adjacent the low speed centrifugal clutch 4. Clutch outer members of the first speed and second speed centrifugal clutches 4 and 6 are integrally formed in one body as a low and medium speed clutch outer member 7. Arranged at one end surface of the clutch outer member 7 is a planetary gear unit 8 formed by a ring gear 8a formed on the one end surface of the member 7, a plurality of planet gears 8b meshing with the internal teeth of the ring gear 8a and a sun gear 8c meshing with the planet gears 8b. The planet gears 8b have respective shafts rotatably supported by a retainer 8d secured on the first hollow shaft 5, while the sun gear 8c is secured on a collar 8e which is loosely fitted on the first hollow shaft 5. Integrally attached to the collar 8e is a radially extending circular ratchet plate 8f provided with a plurality of ratchet pawls 8f. The pawls 8f are disposed for engagement with the teeth of a ratchet ring 10 secured on a supporting member 9' extending radially inwardly from a transmission case 9 in a manner permitting the sun gear 8c to rotate in one direction only.

Secured on an intermediate portion of the first hollow shaft 5 is a clutch outer member 11a of a centrifugal clutch 11 for a third or high speed. A clutch inner member 11b of the clutch 11 is linked with a drive gear 13a of a reduction gear 13 for the high speed through a second hollow shaft 12 which is also loosely fitted on the first hollow shaft 5. Rigidly mounted on the other end portion of the first hollow shaft 5 is a drive gear 14a of a reduction gear 14 for the low speed. The drive gear 13a meshes with a driven gear 13b for the high speed which is rigidly mounted on a first intermediate shaft 15 extending parallel with the crankshaft 3, while the drive gear 14a meshes with a driven gear 14b for the low speed secured on a hollow shaft 16 which is loosely fitted on the first intermediate shaft 15. Further, the first intermediate shaft 15 and the hollow shaft 16 can be drivingly coupled with each other by means of a one-way clutch 17. In addition, a drive gear 18a of a reduction gear 18 for the medium speed is secured on the first intermediate shaft 15 at a side remote from the driven gear 13 and engages with a driven gear 18b arranged at one end portion of a second intermediate shaft 19 which extends parallel with the first intermediate shaft. Further, a sprocket 20 is mounted on the other end portion of the second intermediate shaft 19 to drive a rear wheel of the motorcycle, not shown, through a driving chain 21.

The operation of the automatic multispeed transmission constructed as above will now be expalined.

First, when the engine is started, the crankshaft 3 rotates in unison with the rotation of the engine. If the speed of the crankshaft is low, the low speed centrifugal clutch 4 mounted on the crankshaft 3 is kept in a disengaged state and accordingly the crankshaft 3 rotates at an idle speed and hence the motorcycle does not start.

When the rotational speed of the crankshaft 3 increases up to a speed corresponding to the engaging rotational speed of the low speed clutch 4 by means of operation of the accelerator grip of the motorcycle, not shown, its low speed clutch inner member 4a is caused to engage with the low and medium speed clutch outer member 7 by a centrifugal force acting upon a weight 4b of the clutch inner member 4a, resulting in rotation of the ring gear 8a of the planetary gear unit 8 which is integrally formed with the clutch outer member 7.

Assuming that, as indicated by the arrow A in FIG. 1, the crankshaft 3 rotates counterclockwise as viewed from the side of the piston 1, i.e., from the left side of FIG. 1, the ring gear 8a rotates in the same direction and the rotation of the gear 8a causes an orbital movement of the planet gears 8b as well as clockwise rotations of the sun gear 8c and the ratchet plate 8f formed integrally therewith. As a result, the pawls 8f' of the ratchet plate 8f come into engagement with the teeth of the ratchet ring 10 secured on the side of the transmission case 9. Thus, the sun gear 8c becomes stationary. Accordingly, due to counterclockwise rotation of the ring gear 8a, the planet gears 8b spin counterclockwise, while simultaneously revolving counterclockwise about the stationary sun gear 8c. This orbital movement of the planet gears 8b causes a counterclockwise rotation of the first hollow shaft 5 through the retainer 8d, which in turn causes a clockwise rotation of the first intermediate shaft 15, as shown by the arrow B, through the low speed reduction gear 14, the hollow shaft 16 mounted on the first intermediate shaft 15 and the one-way clutch 17, and further causes a counterclockwise rotation of the second intermediate shaft 19, as indicated by the arrow C, through the medium speed reduction gear 18. The rotation of the shaft 19, in turn, causes a rotation of the rear wheel of the motorcycle through the sprocket 20 and the driving chain 21, thereby starting the motorcycle.

On this occasion, the clutch inner member 11b of the high speed clutch 11 is driven by the rotating first intermediate shaft 15 through the high speed drive gear 13a and the second hollow shaft 12. However, the high speed reduction gear 13 runs idle since the clutch inner member 11b and the clutch outer member 11a are then kept disengaged from each other.

At the start of the motorcycle with the low speed centrifugal clutch 4 engaged, the motorcycle is driven by a large driving power or torque at a low speed due to a large combined transmission ratio of the planetary gear unit 8 and the low speed reduction gear 14. When the rotational speed of the crankshaft 3 further increases up to a speed corresponding to the engaging rotational speed of the second or medium speed centrifugal clutch 6, the medium speed clutch inner member 6a is brought into engagement with the low and medium speed clutch outer member 7. As a result, the first hollow shaft 5 and the ring gear 8a rotate in unison with each other, thus relative movements of the ring gear 8a and the planet gears 8b are prohibited. The counterclockwise rotation of the ring gear 8a causes counterclockwise rotation of the first hollow shaft 5 through the planet gears 8b and the retainer 8d. This in turn causes a counterclockwise rotation of the sun gear 8c meshing with the planet gears 8b. Accordingly, the ratchet plate 8f rotating in unison with the sun gear 8c is caused to rotate in the direction for disengaging the ratchet pawls 8f' from the ratchet ring 10. A transmission path of the driving power through the transmission component downstream of the first hollow shaft 5 is the same as that at the start of the motorcycle previously explained.

When the second gear engages, the rotational speed of the crankshaft 3 is transmitted directly to the low speed reduction gear 14 without speed reduction by the planetary gear unit 8. Therefore, the transmission ratio takes a middle value which is less than that obtained at the start of the motorcycle, to drive the motorcycle at a medium speed and by torque having a medium value.

With a further increase in the rotational speed of the crankshaft 3, the clutch inner member 11b of the high speed centrifugal clutch 11, which is driven by the first intermediate shaft 15 through the high speed drive gear 13a and the second hollow shaft 12, has its rotational speed increased above the engaging rotational speed of the clutch 11 to bring the clutch outer member 11a and the inner member 11b into engagement with each other. That is, on this occasion, all of the centrifugal clutches for the low, medium and high speeds 4,6 and 11 engage. As a result, the rotation of the crankshaft 3 is directly transmitted without any speed reduction, to the first hollow shaft 5 through the ring gear 8a, planet gears 8b and retainer 8d of the unit 8 rotatable in unison with the medium speed clutch 6, and thereafter is directly transmitted to the second hollow shaft 12 through the high speed clutch 11. The rotation of the second hollow shaft 12 is transmitted to the first intermediate shaft 15 through the high speed reduction gear 13, and then transmitted to the rear wheel through the intermediate reduction gear 18, the second intermediate shaft 19, the sprocket 20 and the drive chain 21, to thus drive the vehicle at a high speed, with a small speed reduction ratio and by a small driving force.

In this position, the hollow shaft 16 mounted on the first intermediate shaft 15 is also simultaneously rotatively driven by the first hollow shaft 5 through the low speed reduction gear 14. However, the rotational speed of the hollow shaft 16 is smaller than that of the first intermediate shaft 15 driven through the high speed reduction gear 13 and thus the one-way clutch 17 runs idle. As a result, the first hollow shaft 5 and the first intermediate shaft 15 can not be drivingly coupled with each other by the low speed reduction gear 14.

As described above, according to the conventional automatic multispeed transmission for motorcycles, the centrifugal clutches have their clutch inner members engage with the respective clutch outer members at their respective predetermined engaging rotational speeds as the crankshaft speed reaches these speeds, thereby effecting automatic gear changing at predetermined changing points.

On the other hand, a transmission according to the present invention is designed on the basis of a principle explained hereinbelow and is capable of achieving required vehicle speeds and driving force or torque even when the vehicle is running under large running resistance condition.

The present invention is based upon the principle that if engagement is prohibited between the clutch inner member and clutch outer member of a particular clutch combined with a reduction gear having a reduction ratio larger than the smallest one even when the rotational speed of the weights of the clutch exceeds its predetermined engaging speed, gear changing or shifting-up by the above clutch does not take place so that the vehicle can continue running with a reduction ratio of another adjacent gear larger than that of the above gear, and on the contrary, if the above engagement prohibiting action is rendered ineffective, the above clutch can engage on the above occasion, to obtain the reduction ratio of the above gear combined therewith, which is smaller than that of the above adjacent gear.

Figure 2:
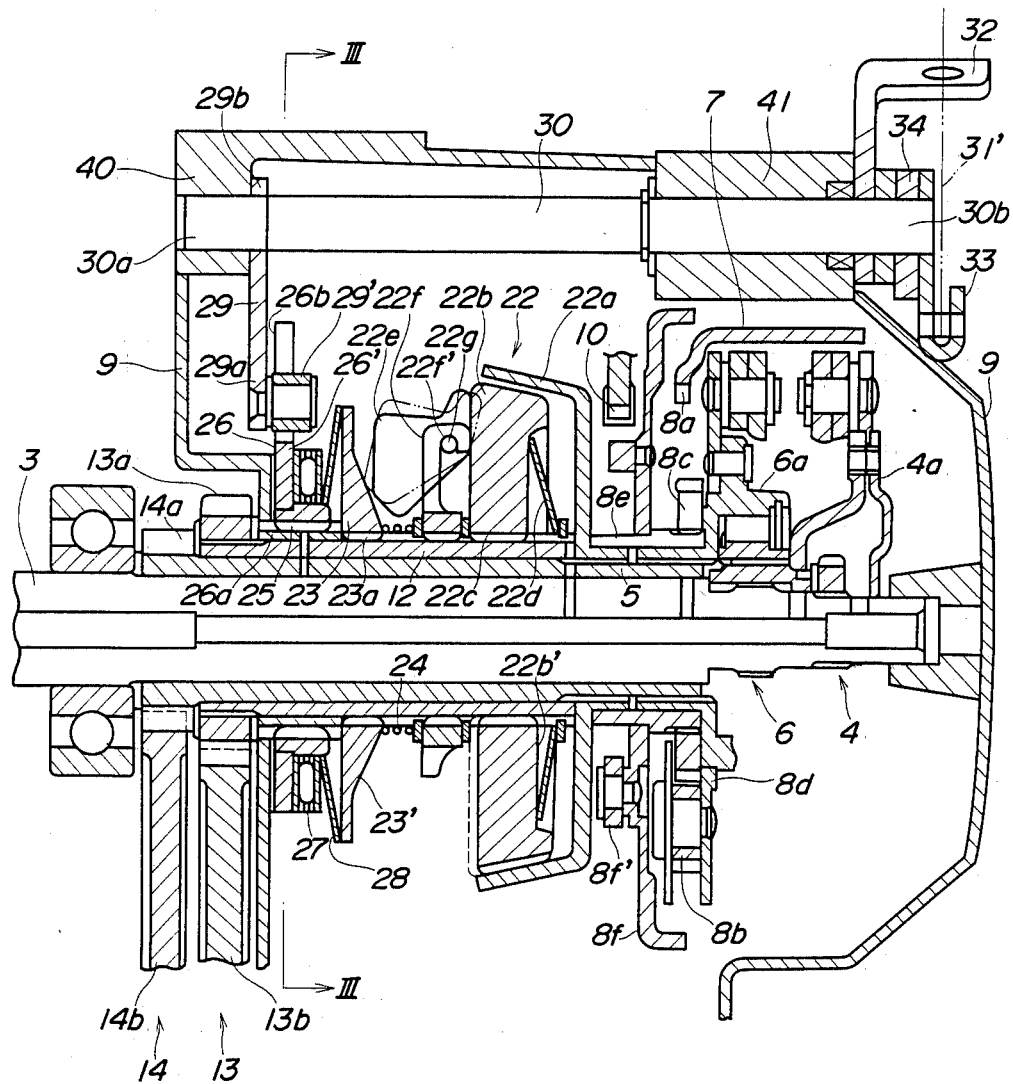
FIG. 2 is a fragmentary elevational sectional view of an automatic three-speed transmission embodying the present invention.
Figure 3:
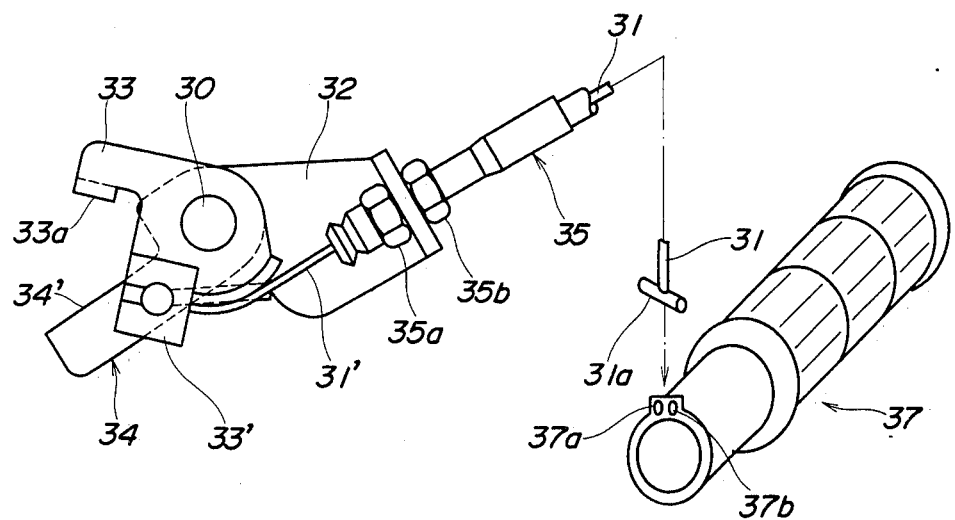
FIG. 3 is an enlarged fragmentary elevational sectional view taken along line III—III in FIG. 1.
Figure 4:
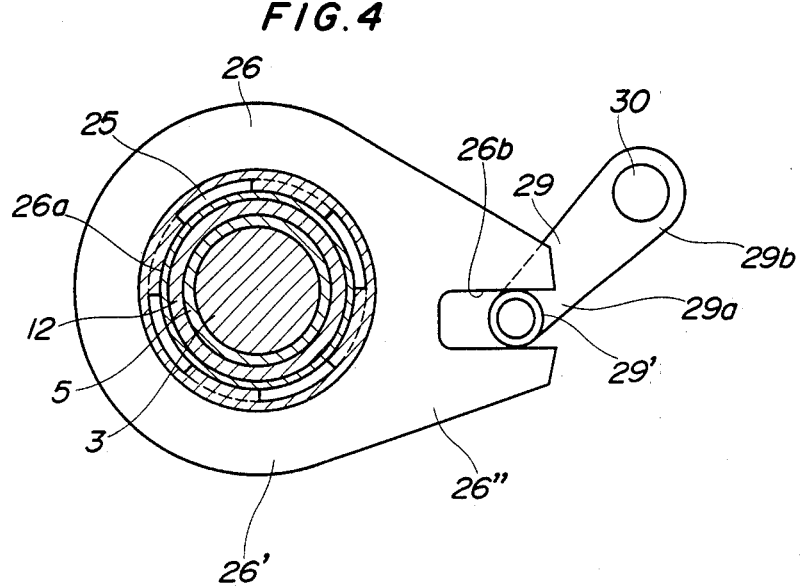
FIG. 4 is an enlarged fragmentary side view of a rotary shaft and its peripheral elements in FIG. 2.

Referring to FIGS. 2 through 4, there is illustrated an embodiment of the present invention.

This embodiment is based upon application of the above principle of the invention to an automatic threespeed transmission for motorcycles, of which some component elements are identical in construction and arrangement with those of the conventional transmission shown in FIG. 1. The identical component elements are designated in FIG. 2 by the same reference numerals as those in FIG. 1, and explanation of which is partly omitted.

In FIG. 2, a high speed centrifugal clutch 22 is comprised of a cone-type centrifugal clutch of which an output member or clutch outer member 22a has a substantially hollow truncated conical shape and is integrally secured to a first hollow shaft 5 which is rotatably loosely fitted on a crankshaft 3. An input member or clutch inner member 22b of the clutch 22, which has a truncated conical shape corresponding to the shape of the outer member 22a, is spline-fitted through splines 22c on a second hollow shaft 12 which is loosely fitted on the first hollow shaft 5, in a manner rotatable in unison with the second hollow shaft 12 and axially movable. That is, the clutch inner member 22b is adapted to have its outer periphery brought into urging contact with and separated from an inner periphery of the clutch outer member 22a as it axially moves. Further, the clutch inner member 22b is urged in the direction for disengaging the clutch 22 by a Belleville spring 22d disposed in contact with a recess 22b' in the member 22b at its one end and with the second hollow shaft 12 at its other end.

A retainer 22f, as a retainer means, is fitted on the second hollow shaft 12 rotatable in unison with this shaft 12 and arranged adjacent a side of the clutch inner member 22b remote from the clutch outer member 22a. A plurality of weight members 22e are attached to the retainer 22f by means of pins 22g inserted into slots 22f' formed in an outer peripheral portion of the retainer 22f, in a manner displaceable or openable axially of the crankshaft 3 (the opened state of the weight 22e is shown by the two-dot chain line) and disposed at circumferentially equal intervals.

Next, means for prohibiting the opening motion of the weight members 22e of the clutch 22 will be explained. An urging member 23 forming a main element of the prohibiting means is spline-fitted on the second hollow shaft 12 by means of a plurality of splines 23a, which is spaced from the retainer 22f and is rotatable in unison with the shaft 12 and axially movable, so as to urgingly displace the weights 22d toward the clutch inner member 22b.

The urging member 23 is in the form of an annular plate and has an urging surface 23' having a predetermined suitable profile forming a side surface facing the weights 22e of the member 23. A return spring 24 is loosely fitted on the second hollow shaft 12 between the retainer 22f and the urging member 23.

A quick feed screw member 25 in the form of a hollow tube is formed with a multiple thread on its outer peripheral surface. This screw member 25 loosely receives therethrough the second hollow shaft 12 and is rigidly secured at its one end to one side wall of the transmission case 9 remote from the clutch 22. A first lever 26 has a tapped central through hole 26a threadedly fitted on the threaded outer peripheral surface of the quick feed screw member 25 and a substantially annular main body 26' extending radially outwardly from its central portion formed with the tapped hole 26a.

Interposed between the main body 26' and the urging member 23 are a thrust bearing 27 fitted on the tapped portion 26a and an elastic member 28 formed by a Belleville spring or the like. The elastic member has its one end abutting on the bearing 27 and its other end abutting on the urging member 23, to urge the urging member 23 against the clutch 22. The thrust bearing 27 bears relative movements of the first lever 26, which is usually stationary, and the elastic member 28 rotating in the rotational direction of the second hollow shaft 12. On the one hand, the elastic member 28 acts as safety means or disabling means which renders the urging member 23 inoperative when the motorcycle is running at a speed higher than a predetermined speed. To this end, the elastic member 28 is formed of a material having such a predetermined external load-deformation characteristic and a predetermined shape as to be suitably elastically deformed due to the urging force of the urging member 23 when the centrifugal force generated by the revolving weight members 22e is larger than a predetermined external load applied to the elastic member 28, in other words, when the opening or expanding force of the weight members 22e is larger than a predetermined value.

Alternatively of arranging the elastic member 28 between the urging member 23 and the first lever 26 as in the illustrated embodiment, the elastic member 28 may be arranged between the urging member 23 and the weights 22e, which can provide the same results.

A first lever 26 has a projecting portion 26" formed with a substantially rectangular cut or slot 26b at its tip. A roller 29' is arranged in engagement with the slot 26b and is rotatably mounted on one end portion 29a of a second lever 29. The other end portion 29b of the second lever 29 is secured to one end portion 30a of a shaft 30. The shaft 30 extends parallel with the crankshaft 3 at a location radially outward of the clutch 22, and is rotatably journalled at its opposite ends 30a, 30b by bearings 40, 41 mounted on the transmission case 9.

Mounted on the other end portion 30b of the shaft 30 are a third lever 34 which forms the weight-opening prohibiting means in cooperation with the above-mentioned elements, a supporting member 32 and a fourth lever 33 forming part of a control mechanism for driving the weight-opening prohibiting means. The supporting member 32 has a substantially L shape and is fitted on the shaft 30 at its one side, and supports an adjuster 35 at its other side. The adjuster 35 is connected at its one end to a controlling wire 31 connected to an accelerator grip 37 and at its other end to another controlling wire 31' fastened by a set screw, not shown, to a fastening lug 33' formed integrally on the fourth lever 33, respectively, and is adapted to adjust the total effective length of the controlling wires 31, 31' by means of adjusting nuts 35a, 35b. The accelerator grip 37 is mounted on the steering handle, not shown, of the motorcycle and forms part of a mechanism, not shown, for adjusting the opening of the throttle valve as well as part of the controlling mechanism described above. Formed integrally on an end of the accelerator grip 37 are fastening protrusions 37a, 37b for fastening one end of the controlling wire 31 to the accelerator grip 37 in cooperation with a rod member 31a secured to the same end of the wire 31. The third lever 34 has a projecting portion 34' extending toward the crankshaft 3 and rigidly fitted on the end portion 30b of the shaft 30 in a manner rotatable in unison with the shaft 30. The fourth lever 33 is loosely fitted on the shaft 30 and is formed with a contacting portion 33a facing the projecting portion 34'. In the above manner, the fourth lever 33 is connected to the controlling wire 31 through the controlling wire 31' and the adjuster 35 and is piovotally moved about the shaft 30 in unison with operation of the accelerator grip 37 for varying the throttle valve opening of the engine. The third and fourth levers 34 and 33 are disposed to keep the projecting portion 34' and the contacting portion 33a separated from each other when the accelerator grip 37 is in a position corresponding to the full closing of the throttle valve, to bring the contacting poirtion 33a into contact with the projecting portion 34' when the accelerator grip 37 is operated into a position ocrresponding to a predetermined throttle valve opening. The third lever 34 is pivotally moved about the shaft 30 in unison with the fourth lever 33 when the accelerator grip 37 is further operated to further increase the throttle valve opening.

The automatic multispeed transmission for vehicles according to the embodiment as constructed above operates as follows.

When the throttle valve opening of the engine is increased by operation of the accelerator grip 37 at the start of the engine, the rotational speed of the crankshaft 3 increases up to a speed corresponding to the engaging rotational speed of the low speed centrifugal clutch 4 to cause engagement of same. As a result, the low speed gear providing a low speed and a large driving force is rendered operative to start the motorcycle. Subsequently, if the throttle valve opening is further increased by further operating the accelerator grip 37, the speed of the crankshaft 3 is further increased up to a speed corresponding to the engaging rotational speed of the medium speed centrifugal clutch 6 to thereby engage same. Then, the vehicle is driven by the second gear at a medium speed and by a medium driving force.

When the crankshaft speed reaches a speed corresponding to the engaging rotational speed of the high speed centrifugal clutch 22 as a consequence of further opening of the throttle valve, the clutch 22 becomes engaged to drive the vehicle with the high speed gear engaged, at a high speed and by a smaller driving force.

In this situation, if the vehicle undergoes large running resistance on such an occasion as starting to ascend a steep slope, the crankshaft speed drops below a speed corresponding to the engaging rotational speed of the high speed centrifugal clutch 22. As a result, the clutch 22 is disengaged due to a corresponding decrease in the centrifugal force of the weight members 22e to cause shifting down from the third speed to the second speed. On this occasion, in a conventional transmission shown in FIG. 1, if the driver operates the accelerator grip in a manner increasing the throttle valve opening so as to allow the vehicle to ascend the slope at a speed higher than a speed obtainable with the second gear, the high speed clutch 11 in FIG. 1 is engaged again at the time the speed of the vehicle reaches the speed corresponding to the engaging rotational speed of the clutch 11. This causes insufficiency in the torque or driving force. Therefore, in ascending the slope, the driver has to keep the running speed within a range for maintaining the second gear operative.

On the other hand, in driving a vehicle equipped with the transmission according to the present invention, when the driver operates the accelerator grip 37 to increase the throttle valve opening, the controlling wires 31 and 31' connected to the accelerator grip 37 are drawn to rotate the fourth lever 33 about the shaft 30. This brings the contacting portion 33a of the fourth lever 33 into contact with the projecting portion 34' of the third lever 34 to cause rotation of the third lever 34. That is, when the throttle valve opening becomes larger than a predetermined value, the third lever 34 is rotated together with the rotating fourth lever 33 to cause rotation of the shaft 30 in unison therewith. This causes pivotal movement of the second lever 29 about the shaft 30, which in turn causes rotation of the first lever 26 engaged therewith. The first lever 26, which threadedly engages with the quick feed screw 25, moves toward the clutch 22 along the crankshaft 3, as it rotates about the crankshaft 3, to urgingly displace the urging member 23 toward the clutch 22 along the second hollow shaft 12 through the thrust bearing 27 and the elastic member 28 against the force of the return spring 24, until it brings the urging surface 23' of the urging member 23 into urging contact with opposed surfaces of the weight members 22e of the high speed centrifugal clutch 22 to prohibit the expanding pivotal movement of the weight members 22e about their respective pins 22g. As a result, the clutch inner member 22b of the clutch 22 is urged by the Belleville spring 22d in the direction of disengagement of the clutch 22 to disengage the clutch 22. Since on this occasion the low speed and medium speed clutches 4, 6 (FIG. 1) are both in engaged positions, shifting-down from the third speed to the second speed automatically takes place. Thereafter, the second gear is kept in its engaged position with the throttle valve opening kept at a large value, making it possible for the vehicle to ascend the slope with the second gear kept engaged, at a speed larger than a speed corresponding to the changing point from the second speed to the third speed. When the accelerator grip is operated to return the throttle valve opening to a usual opening after the vehicle has finished ascending the slope, the fourth lever 33 is reversely rotated to its initial position where the contacting portion 33a of the fourth lever 33 and the projecting portion 34' of the third lever 34 are separated from each other. As a consenquence, the shaft 30 is reversely rotated to its initial position and accordingly the return spring 24 is returned to its initial position, accompanied by returning of the urging member 23 to its initial position against the elastic force of the elastic member 28. On this occasion, the weights 22e can again be expanded as indicated by the two-dot chain line in FIG. 2 to cause the high speed centrifugal clutch 22 to engage, thereby rendering the third gear operative. Although the above given explanation refers to an example in which shifting-down from the third speed to the second speed takes place when there occurs an increase in the running resistance during running of the vehicle with the third gear engaged, it is possible according to the invention to keep the second gear engaged by virtue of the weight-opening prohibiting function until after a desired higher speed of the vehicle has been attained, without shifting up to the third speed, when there occurs an increase in the running resistance during running with the second gear engaged, to thereby ensure attainment of a large driving force.

Besides the above functions, according to the invention, when the vehicle speed exceeds a predetermined speed, the resulting increased centrifugal force of the weights 22e of the clutch 22 causes deformation of the elastic member 28 toward the thrust bearing 27 in cooperation with the return spring 24, so that the weights 22e can then expand to urgingly displace the clutch inner member 22b into urging contact with the clutch outer member 22a, rendering the action of the weight-opening prohibiting means ineffective. Accordingly, no shifting-down from the third speed to the second speed takes place when the vehicle speed exceeds the predetermined speed, and shifting-up from the second speed to the third speed is feasible, if required.

Although in the illustrated embodiment the high speed centrifugal clutch 22 comprises a truncated conical type which is compact in size and excellent in durability, other type clutches such as a multi-plate type may be employed in the transmission according to the invention, if only they have weights arranged for opening radially outwardly of rotary shafts on which they are mounted. Further, any type suitable clutches may be used for a low speed and a medium speed in the transmission according to the invention.

Further, the high speed centrifugal clutch may be arranged on a different shaft from the crankshaft or on a shaft arranged out of alignment with the crankshaft, alternatively of the arrangement in the illustrated embodiment where the clutch is arranged on a shaft arranged in alignment with the crankshaft. If necessary, the clutches may be arranged on respectivce different shafts.

Although in the illustrated embodiment the weight-opening prohibiting means is formed by mechanical means, manually operatable means may be used which includes an urging member formed of a magnetic material which is arranged for displacement into urging contact with the weights of the high speed clutch when it is electromagnetically energized.

As set forth above, the transmission according to the invention comprises prohibiting means for prohibiting or limiting the expanding motion of the weights of the high speed centrifugal clutch, control means including the accelerator grip, etc. for control of the throttle valve opening for controlling the above prohibiting means, and disabling means for rendering the prohibiting means ineffective when the expanding force of the weights exceeds a predetermined value, and therefore can provide various excellent results as follows:

(a) As distinct from conventional automatic multi-speed transmissions where shifting-up from a second speed to a third speed takes place at a predetermined constant speed of the engine irrespective of the value of the running resistance which the vehicle undergoes, according to the present invention the vehicle can be driven with a large reduction ratio obtained by a medium speed gear engaged and by a large driving force until after a desired vehicle speed has been obtained, when the vehicle undergoes large running resistance;

(b) Shifting-down from a high speed to a medium speed can be effected without a reduction in the vehicle speed when the vehicle undergoes increased running resistance during running with a high speed gear engaged, if the driver so desires;

(c) The control means for the weight-opening prohibiting means may be formed by a conventional control mechanism such as one including the accelerator grip, and therefore no particular control means is required, thus greatly facilitating the control operation;

(d) The transmission according to the invention can be manufactured and installed into a vehicle by adding very few alterations to the specifications of a construction identical with that of a conventional transmission, facilitating the manufacture and low in manufacturing cost;

(e) Setting of a vehicle speed on which the transmission is to operate can be easily made by using a conventional control mechanism such as one for varying the throttle valve opening;

(f) Even during running with the high speed centrifugal clutch prevented from engaging by means of the weight-opening prohibiting means, the same clutch is allowed to automatically engage when the vehicle speed or the engine speed exceeds a predetermined speed, thus preventing overspeed of the engine as well as speed changing shocks.

Obviously many modifications and variations of the present invention are possible in the light of the above disclosure. It is therefore to be understood that within the scope of the appended claims the invention may be practiced otherwise than as specifically described.

What is claimed is:

1. An automatic multispeed transmission for combination with a vehicle equipped with an engine having a throttle value adjusting means for manually controlling the quantity of intake air being supplied to the engine, said quantity corresponding to the opening of a throttle valve of said engine, and an output shaft, comprising:

at least two centrifugal clutches each arranged on a corresponding rotary shaft arranged to be rotatively driven by said output shaft of said engine, said centrifugal clutches being adapted to engage at predetermined different rotational speeds of said output shaft of said engine, each of said centrifugal clutches including:

an input member arranged to be rotatively driven by the rotary shaft upon which the corresponding centrifugal clutch is arranged, an output member disposed for engagement with said input member, and weight means disposed for centrifugal opening action in response to rotation of said rotary shaft for causing engagement of said input member with said output member at one of said predetermined different rotational speeds of said output shaft of said engine;

at least two reduction gear means each drivingly coupled with one of the output members and the input member of a corresponding one of said centrifugal clutches for carrying out speed reduction of the rotational speed of said engine with predetermine different reduction ratios, dependent upon engagement and disengagement of said respective centrifugal clutches;

prohibiting means for prohibiting the centrifugal opening action of said weight means of one of said centrifugal clutches which is adapted to engage at one of said predetermined rotational speeds of said output shaft of said engine, higher than the lowest one thereof;

wherein when said one of said centrifugal clutches is engaged, one of said reduction gear means operates, which has a reduction ratio smaller than that of another one of said reduction gear means which operates when another one of said centrifugal clutches engages at the lowest one of said predetermined rotational speeds of said output shaft; and manually operatable control means for driving said prohibiting means, said manually operatable control means being operatively connected with said throttle valve adjusting means in such a manner that said control means operates to drive said prohibiting means when said throttle valve adjusting means assumes a position corresponding to an intake air quantity greater than a predetermined value.

2. An automatic multispeed transmission as claimed in claim 1, wherein said prohibiting means comprises urging means disposed for axial movement along said rotary shaft into urging contact with said weight means of said one centrifugal clutch, and biasing means arranged to be driven by said control means for causing displacement of said urging means into urging contact with said weight means of said one centrifugal clutch, whereby the centrifugal opening action of said weight means of said one centrifugal clutch is prevented by said urging means when said biasing means is driven by said control means.

3. An automatic multispeed transmission as claimed in claim 2, wherein said urging means of said prohibiting means includes an urging member disposed for rotation in unison with said rotary shaft and axial movement therealong, said urging member having an urging surface having a predetermined profile and disposed for urging contact with said weight means of said one centrifugal clutch.

4. An automatic multispeed transmission as claimed in claim 2, wherein said one centrifugal clutch comprises an input member having a hollow truncated conical shape and an inner peripheral surface, an output member arranged for rotation in unison with said hollow shaft, said input member having a truncated conical shape, an outer peripheral surface disposed for urging contact with said inner peripheral surface of said input member, and an end surface remote from said input member, and weight means arranged for rotation in unison with said hollow shaft, said weight means being disposed for urging contact with said end surface, said weight means being disposed for bringing said output member into urging contact with said input member at a predetermined rotational speed of said output shaft of said engine.

5. An automatic multispeed transmission as claimed in claim 1, wherein at least one rotary shaft includes a hollow shaft loosely fitted on said output shaft of said engine.

6. An automatic multispeed transmission for combination with a vehicle equipped with an engine having an output shaft, comprising:

at least two centrifugal clutches each arranged on a corresponding rotary shaft arranged to be rotatively driven by said output shaft of said engine, said centrifugal clutches being adapted to engage at predetermined different rotational speeds of said output shaft of said engine, each of said centrifugal clutches including:

an input member arranged to be rotatively driven by the rotary shaft upon which the corresponding centrifugal clutch is arranged, an output member disposed for engagement with said input member, and weight means disposed for centrifugal opening action in response to rotation of said rotary shaft for causing engagement of said input member with said output member at one of said predetermined different rotational speeds of said output shaft of said engine;

at least two reduction gear means drivingly coupled with the output members of respective ones of said centrifugal clutches for carrying out speed reduction of the rotational speed of said engine with predetermined different reduction ratios, dependent upon engagement and disengagement of said respective centrifugal clutches;

prohibiting means for prohibiting the centrifugal opening action of said weight means of one of said centrifugal clutches which is adapted to engage at one of said predetermined rotational speeds of said output shaft of said engine, higher than the lowest one thereof, said prohibiting means comprising urging means disposed for axial movement along said rotary shaft into urging contact with said weight means of said one centrifugal clutch, and biasing means arranged to be driven by said control means for causing displacement of said urging means into urging contact with said weight means of said one centrifugal clutch, whereby the centrifugal opening action of said weight means of said one centrifugal clutch is prevented by said urging means when said biasing means is driven by said control means, said urging means of said prohibiting means including an urging member disposed for rotation in unison with, and for axial movement along said rotary shaft, said urging member having an urging surface with a predetermined profile and being disposed for urging contact with said weight means of said one centrifugal clutch, said urging means of said prohibiting means further including a quick speed screw member immovably arranged at one side of said urging member remote from said one centrifugal clutch, said quick speed screw having a threaded outer peripheral surface, and a lever having a threaded portion threadedly fitted on said threaded outer peripheral surface of said quick speed screw member, said level being adapted to be driven by said biasing means for axial and rotative movement relative to said quick speed screw member toward said urging member.

7. An automatic multispeed transmission as claimed in claim 6, further including casing means enclosing at least said one centrifugal clutch, and wherein said biasing means of said prohibiting means comprises a second rotary shaft rotatably supported by said casing means, a second lever disposed for rotation in unison with said second rotary shaft and drivingly coupled to said lever of said urging means, and a third lever disposed for rotation in unison with said second rotary shaft and drivingly connected to said control means.

8. An automatic multispeed transmission as claimed in claim 7, wherein said control means comprises a fourth lever loosely fitted on said second rotary shaft for rotatively dirving said third lever, an accelerator manually operatable for changing the output of said engine, and controlling wire means connected at one end thereof to said aceelerator and at another end thereof to said fourth lever, respectively.

9. An automatic multispeed transmission for combination with a vehicle equipped with an engine having an output shaft, comprising:

at least two centrifugal clutches each arranged on a corresponding rotary shaft arranged to be rotatively driven by said output shaft of said engine, said centrifugal clutches being adapted to engage at predetermined different rotational speeds of said output shaft of said engine, each of said centrifual clutches including:

an input member arranged to be rotatively driven by the rotary shaft upon which the corresponding centrifugal clutch is arranged, an output member disposed for engagement with said input member, and weight means disposed for centrifugal opening action in response to rotation of said rotary shaft for causing engagement of said input member with said output member at one of said predetermined different rotational speeds of said output shaft of said engine;

at least two reduction gear means drivingly coupled with the output members of repsective ones of said centrifugal clutches for carrying out speed reduction of the rotational speed of said engine with predetermined different reduction ratios, dependent upon engagement and disengagement of said respective centrifugal clutches;

prohibiting means for prohibiting the centrifugal opening action of said weight means of one of said centrifugal clutches which is adapted to engage at one of said predetermined rotational speeds of said output shaft of said engine, higher than the lowest one thereof;

manually operable control means for driving said prohibiting means; and disabling means adapted for rendering said prohibiting means ineffective to allow the centrifugal opening action of said weight means of said one centrifugal clutch when said last-mentioned weight means has a centrifugally opening force thereof larger than a predetermined value.

10. An automatic multispeed transmission as claimed in claim 9, further including an urging member disposed for axial movement along said rotary shaft, and wherein said disabling means comprises an elastic member arranged at one side of said urging member remote from said one centrifugal clutch, said elastic member being disposed to be urged by said urging member, whereby said elastic member is elastically deformed in a direction away from said one centrifugal clutch by said urging member disposed in urging contact with said weight means of said one centrifugal clutch when said last-mentioned weight means has a centrifugally opening force thereof increased above a predetermined value.

11. An automatic multispeed transmission as claimed in claim 10, wherein said disabling means further includes spring means urging said urging member in a direction away from said one centrifugal clutch.

12. An automatic multispeed transmission as claimed in claim 11, further including a retainer member fitted on said rotary shaft for axial movement relative to said input member of said one centrifugal clutch, and wherein said weight means of said one centrifugal clutch is mounted on said retainer member for opening radially of said rotary shaft, said spring means being interposed between said urging member and said retainer member and urging said retainer member toward said input member of said one centrifugal clutch.

* * * * *